(12) United States Patent
Hinoki et al.

(10) Patent No.: US 12,358,842 B2
(45) Date of Patent: Jul. 15, 2025

(54) SILICON CARBIDE CERAMIC

(71) Applicant: Kyoto University, Kyoto (JP)

(72) Inventors: Tatsuya Hinoki, Kyoto (JP); Shohei Yanagawa, Kyoto (JP)

(73) Assignee: Kyoto University, Kyoto (JP)

( * ) Notice: Subject to any disclaimer, the term of this patent is extended or adjusted under 35 U.S.C. 154(b) by 0 days.

(21) Appl. No.: 18/394,548

(22) Filed: Dec. 22, 2023

(65) Prior Publication Data

US 2024/0343653 A1    Oct. 17, 2024

Related U.S. Application Data

(62) Division of application No. 16/613,729, filed as application No. PCT/JP2018/018601 on May 14, 2018, now abandoned.

(30) Foreign Application Priority Data

May 15, 2017    (JP) ................. 2017-096885

(51) Int. Cl.
*C04B 35/565*    (2006.01)
*C04B 35/573*    (2006.01)
*C04B 35/626*    (2006.01)
*C04B 35/628*    (2006.01)
*C04B 35/64*    (2006.01)
(Continued)

(52) U.S. Cl.
CPC .......... *C04B 35/565* (2013.01); *C04B 35/573* (2013.01); *C04B 35/62625* (2013.01); *C04B 35/62863* (2013.01); *C04B 35/64* (2013.01); *C04B 35/80* (2013.01); *C04B 41/009* (2013.01); *C04B 41/4556* (2013.01); *C04B 41/5024* (2013.01); *C04B 41/87* (2013.01); *C04B 2235/3217* (2013.01); *C04B 2235/3224* (2013.01); *C04B 2235/3826* (2013.01); *C04B 2235/3852* (2013.01); *C04B 2235/422* (2013.01); *C04B 2235/428* (2013.01);
(Continued)

(58) Field of Classification Search
None
See application file for complete search history.

(56) References Cited

U.S. PATENT DOCUMENTS

2002/0063118 A1    5/2002   Koshkarian et al.
2017/0341986 A1    11/2017  Hinoki et al.

FOREIGN PATENT DOCUMENTS

EP    2639211 A1    9/2013
JP    2004-299948 A    10/2004
(Continued)

OTHER PUBLICATIONS

Machine translation of WO 2005026075 A1 via Espacenet, translated Sep. 18, 2024 (Year: 2005).*

(Continued)

*Primary Examiner* — Elizabeth Collister
(74) *Attorney, Agent, or Firm* — Cesari and McKenna, LLP

(57) ABSTRACT

An object of the present invention is to provide an SiC ceramics having an excellent environmentally resistant coating.
An SiC ceramics comprising a metal oxide, the SiC ceramics comprising a surface modification layer containing a silicate, the surface modification layer being derived from a raw material forming the SiC ceramics, which is a matrix.

2 Claims, 6 Drawing Sheets

(51) Int. Cl.
*C04B 35/80* (2006.01)
*C04B 41/00* (2006.01)
*C04B 41/45* (2006.01)
*C04B 41/50* (2006.01)
*C04B 41/87* (2006.01)

(52) U.S. Cl.
CPC ............... *C04B 2235/5244* (2013.01); *C04B 2235/5252* (2013.01); *C04B 2235/616* (2013.01)

(56) References Cited

FOREIGN PATENT DOCUMENTS

| | | |
|---|---|---|
| JP | 2006/514912 A | 5/2006 |
| JP | 2015/171985 A | 10/2015 |
| JP | 2016515994 A | 6/2016 |
| WO | WO 2004/096733 A1 | 11/2004 |
| WO | WO-2005026075 A2 * | 3/2005 ........... C04B 35/565 |
| WO | WO 2014/149757 A1 | 9/2014 |
| WO | WO 2016-093360 A1 | 6/2016 |

OTHER PUBLICATIONS

Schneider, Microstructural Changes in Liquid-Phase-Sintered Silicon Carbide During Creep in an Oxidizing Environment, Journal of the American Ceramic Society, 2003, pp. 501-507, vol. 86.
Office Action issued in European Patent Application No. 18 802 788.2, Dec. 5, 2022.
Office Action issued in Japanese Patent Application No. 2019-518774, Jun. 30, 2022.
Nguyen et al., Strength Improvement and Purification of $Yb_2Si_2O_7$—SiC Nanocomposites by Surface Oxidation Treatment, Journal of the American Ceramic Society, 2017, pp. 3122-3131, vol. 100.
Extended Search Report issued in European Patent Application No. 18 802 788.2, Dec. 22, 2020.

* cited by examiner

SILICON CARBIDE CERAMIC

CROSS-REFERENCE TO RELATED APPLICATIONS

This application is a divisional of U.S. patent application Ser. No. 16/613,729, filed Nov. 14, 2019, which is a national stage entry of International Application No. PCT/JP2018/018601, filed May 14, 2018, which claims priority to Japanese Application No. 2017-096,885, filed May 15, 2017. The content of each of the prior applications is hereby incorporated by reference herein in its entirety.

TECHNICAL FIELD

The present invention relates to a silicon carbide ceramics.

BACKGROUND ART

Ceramic materials made of silicon carbide (hereinafter may also be referred to as "SiC") (the materials may also hereinafter be referred to as "SiC ceramic material") have excellent properties including light weight, heat resistance (high-temperature strength), wear resistance (high hardness), chemical stability (oxidation resistance, corrosion resistance, etc.), high thermal conductivity, low thermal expansion coefficient, reduction in induced radiation, low decay heat, and the like. In the aerospace field, SiC ceramic materials have been used for engines, and the development of aircrafts using SiC ceramic material as an aircraft material has proceeded. In the field of nuclear energy, the application of SiC ceramic materials to fuel-cladding tubes or the like has been considered so as to decrease the risk of hydrogen explosion.

A technique of forming a film on a ceramics substrate by a sol-gel method using a rare earth nitric acid hydrate and tetraethoxysilane as starting materials, followed by a heat treatment of the coated film, thereby forming a rare earth silicate film, was previously disclosed (Patent Document 1). Patent Document 1 uses a sol-gel method to form a film on a ceramics substrate, and discloses only silicon nitride ceramics as a ceramics substrate. However, since a sufficiently elaborate coating film cannot be formed by this film formation using the sol-gel method disclosed in Patent Document 1, or a common film formation technique using plasma-spraying or the like, adhesion between the formed coating film and the ceramics substrate (matrix) was insufficient. As a result, the coating was peeled off, and the environmentally resistant characteristics were deteriorated.

Further, in the technique of Patent Document 1, after the silicon carbide ceramics substrate is formed, a steam corrosion-resistant film is formed on its substrate surface from a rare earth silicate by a sol-gel method using a rare earth nitric acid hydrate and tetraethoxysilane as starting materials. In this technique, when damage such as peeling occurs on the steam corrosion-resistant film, the steam corrosion-resistant film cannot self-repair unless a rare earth metal component, which is a raw material of the rare earth silicate, is externally supplied, for example, by re-subjecting a damaged portion to a sol-gel method.

The present inventors have previously developed a matrix of a multi-phase structure comprising an SiC phase and a phase comprising a material that is low in reactivity with SiC, as well as an SiC fiber-reinforced SiC composite material (hereinafter also referred to as "SiC/SiC composite material") comprising SiC fibers arranged in the matrix (Patent Document 2).

This SiC/SiC composite material is made by combining SiC fibers, and therefore the toughness of the SiC ceramics is improved; moreover, this SiC/SiC composite material has excellent durability since oxidation can be suppressed even under a high-temperature oxidizing atmosphere due to the formation of an oxide film of silica. However, even with such an SiC/SiC composite material, there was a need to maintain the durability under an environment that causes reaction of silica, for example, in the presence of high-temperature steam; this need has not yet been sufficiently discussed.

CITATION LIST

Patent Documents

Patent Document 1: JP2004-299948A
Patent Document 2: International Publication WO2016/093360A1

SUMMARY OF INVENTION

Technical Problem

An object of the present invention is to provide SiC ceramics having excellent environmentally resistant coating.

Solution to Problem

The present invention is the following silicon carbide (SiC) ceramics. The SiC ceramics of the present invention is characterized by comprising a metal oxide and a surface modification layer containing a silicate, and is also characterized in that the surface modification layer is derived from a raw material forming the SiC ceramics, which is a matrix; accordingly, even if the surface modification layer is damaged to the extent that the damage reaches the substrate, the SiC ceramics of the present invention exerts a self-repairing property and thereby forms a new surface modification layer, without requiring an external supply of materials.

[Item 1]
A silicon carbide ceramics comprising a metal oxide,
the silicon carbide ceramics comprising a surface modification layer containing a silicate,
the surface modification layer being derived from a raw material forming the silicon carbide ceramics, which is a matrix.

[Item 2]
The silicon carbide ceramics according to item 1, wherein the surface modification layer comprises 50 wt % or more of the silicate.

[Item 3]
The silicon carbide ceramics according to item 1 or 2, wherein the surface modification layer containing a silicate is produced around the surface of the silicon carbide ceramics as a matrix.

[Item 4]
The silicon carbide ceramics according to any one of items 1 to 3, wherein the metal oxide is at least one metal oxide selected from the group consisting of scandium oxide ($Sc_2O_3$), yttrium oxide ($Y_2O_3$), erbium oxide ($Er_2O_3$), ytterbium oxide ($Yb_2O_3$), alumina ($Al_2O_3$), and lutetium oxide ($Lu_2O_3$).

[Item 5]

The silicon carbide ceramics according to any one of items 1 to 4, wherein the silicate is at least one silicate selected from the group consisting of scandium silicate ($Sc_2Si_2O_7$), yttrium silicate ($Y_2SiO_5$), erbium silicate (Er-$SiO_5$), ytterbium silicate ($Yb_2SiO_5$), ytterbium silicate ($Yb_2Si_2O_7$), aluminum silicate ($Al_2SiO_5$), and lutetium silicate ($LuSiO_5$).

[Item 6]

A method for producing a silicon carbide ceramics, comprising:
(1) a step of dispersing a raw material for forming silicon carbide, and a metal oxide in a dispersion medium;
(2) a step of sintering the dispersion product obtained in step (1); and
(3) a step of heat-treating the sintered product obtained in step (2) to form a surface modification layer containing a silicate on a silicon carbide ceramics as a matrix.

[Item 7]

The method according to item 6, wherein the surface modification layer comprises 50 wt % or more of the silicate.

[Item 8]

The method according to item 7 or 8, wherein step (3) is a step of heat-treating the sintered product obtained in step (2) to form a surface modification layer containing a silicate around the surface of the silicon carbide ceramics as a matrix.

[Item 9]

The method according to any one of items 6 to 8, wherein the metal oxide is at least one oxide selected from the group consisting of scandium oxide ($Sc_2O_3$), yttrium oxide ($Y_2O_3$), erbium oxide ($Er_2O_3$), ytterbium oxide ($Yb_2O_3$), alumina ($Al_2O_3$), and lutetium oxide ($Lu_2O_3$).

[Item 10]

The method according to any one of items 6 to 9, wherein the silicate is at least one silicate selected from the group consisting of scandium silicate ($Sc_2Si_2O_7$), yttrium silicate ($Y_2SiO_5$), erbium silicate ($ErSiO_5$), ytterbium silicate ($Yb_2SiO_5$), ytterbium silicate ($Yb_2Si_2O_7$), aluminum silicate ($Al_2SiO_5$), and lutetium silicate ($LuSiO_5$).

[Item 11]

A ceramic fiber reinforced silicon carbide composite material comprising the silicon carbide ceramics according to any one of items 1 to 5 as a matrix, and ceramic fibers.

[Item 12]

The ceramic fiber reinforced silicon carbide composite material according to item 11, wherein the ceramic fiber is at least one ceramic fiber selected from the group consisting of silicon carbide fiber, alumina fiber, and carbon fiber.

Advantageous Effects of Invention

The SiC ceramics of the present invention comprising a metal oxide has an excellent environmentally resistant coating. The SiC ceramics of the present invention comprising a metal oxide has a surface modification layer containing a silicate. Since the surface modification layer is derived from a raw material forming the silicon carbide ceramics, which is a matrix, the SiC ceramics of the present invention exerts an excellent self-repairing property.

DESCRIPTION OF EMBODIMENTS

[1] SiC Ceramics

Figure 1:
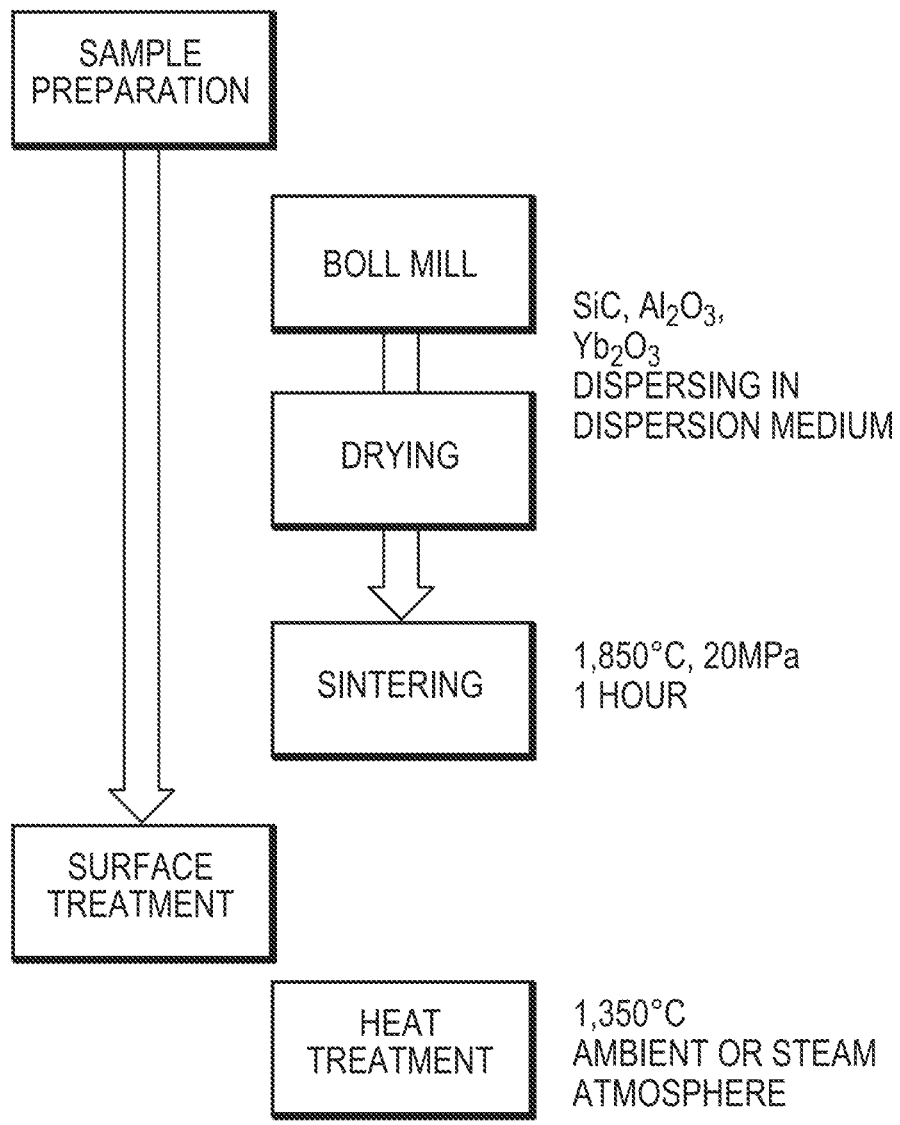
FIG. 1: A figure showing one embodiment of a method for producing SiC ceramics according to the present invention.

The silicon carbide (SiC) ceramics of the present invention is an SiC ceramics comprising a metal oxide. The SiC ceramics of the present invention is characterized by comprising a surface modification layer containing a silicate, wherein the surface modification layer is derived from a raw material forming the SiC ceramics, which is a matrix.

In the SiC ceramics of the present invention, the surface modification layer is formed by a reaction of the silica formed on the surface by the oxidation of SiC contained in the matrix with the metal oxide. More specifically, since the raw material of the surface modification layer is contained in the SiC ceramics, which is a matrix, the SiC ceramics exerts a self-repairing property. The self-repairing property herein refers to the following effect. Since the surface modification layer is derived from a raw material forming the SiC ceramics as a matrix, even if the surface modification layer is damaged under the actual oxidation environment, such as in the presence of high-temperature oxidation or high-temperature steam, and if the damage reaches the substrate, a new surface modification layer is formed at the damaged portion by a reaction of the new silica generated by the oxidation of SiC with the metal oxide contained in the SiC ceramics, even without external supply of materials.

In the SiC ceramics of the present invention, as shown in the production method described below, silica ($SiO_2$) is produced on the ceramics surface upon the oxidation of the SiC contained in the matrix by an oxidation heat treatment, which is performed after a dispersion step and a sintering step. Subsequently, the silica ($SiO_2$) reacts with the metal oxide (such as $Yb_2O_3$) contained in the matrix; as a result, a surface modification layer of silicate (such as $Yb_2SiO_5$, $Yb_2Si_2O_7$, or the like) is formed in the vicinity of the ceramics surface. In this manner, on the surface of SiC ceramics as a matrix, an elaborate surface modification layer containing a silicate, which is derived from a raw material forming the SiC ceramics matrix, is formed.

In the SiC ceramics of the present invention, the raw materials forming the surface modification layer mainly include SiC as the main material; and, for example, a metal oxide ($Yb_2O_3$, $Y_2O_3$, or the like), which is to be added, and the like.

(1) Silicon Carbide (SIC)

As shown in the production method described below, SiC powder may be used as the SiC component for forming an SiC ceramics. Further, when a reaction sintering method is used, a mixture of SiC powder, C powder, and Si powder is used as the raw material for forming silicon carbide.

(2) Metal Oxide

The metal oxide is preferably at least one metal oxide selected from the group consisting of scandium oxide ($Sc_2O_3$), yttrium oxide ($Y_2O_3$), erbium oxide ($Er_2O_3$), ytterbium oxide ($Yb_2O_3$), alumina ($Al_2O_3$), and lutetium oxide ($Lu_2O_3$). More preferable examples of metal oxides include ytterbium oxide ($Yb_2O_3$), alumina ($Al_2O_3$), and the like.

These metal oxides may be used solely, or as a mixture obtained by combining two or more kinds.

(3) Surface Modification Layer Containing Silicate

The silicate contained in the surface modification layer of the SiC ceramics is preferably at least one silicate selected from the group consisting of scandium silicate ($Sc_2Si_2O_7$), yttrium silicate ($Y_2SiO_5$), erbium silicate ($ErSiO_5$), ytterbium silicate ($Yb_2SiO_5$), ytterbium silicate ($Yb_2Si_2O_7$), aluminum silicate ($Al_2SiO_5$), and lutetium silicate ($LuSiO_5$).

The silicate is more preferably a silicate of at least one rare earth element selected from the group consisting of ytterbium silicate ($Yb_2SiO_5$), ytterbium silicate ($Yb_2Si_2O_7$), and aluminum silicate ($Al_2SiO_5$). Examples of silicates further include various silicates such as magnesium silicate, barium-strontium aluminosilicate (BSAS), and the like.

The silicate preferably has excellent heat resistance and environmental resistance, and preferably has a thermal expansion coefficient in the range of 3 to 8 [$\times 10^{-6}$/K]. The thermal expansion coefficient is a proportion of substance expansion caused by temperature increase, and is expressed for each temperature. The unit is per kelvin (/K) (JIS standard).

The silicate may be used solely, or in a combination of two or more kinds.

The surface modification layer, including the silicate ($Yb_2SiO_5$, $Yb_2Si_2O_7$, and the like) forming the surface modification layer, of the SiC ceramics is derived from the raw material forming the SiC ceramics as a matrix. In view of the environmental resistance of the SiC ceramics of the present invention, it is sufficient that the surface modification layer of the SiC ceramics contains a silicate. The surface modification layer preferably contains 50 wt % or more of a silicate in view of excellent heat resistance and environmental resistance of the silicon carbide ceramics to be obtained. The upper limit of the amount of the silicate contained in the surface modification layer is nearly 100 wt %. In this case, the surface modification layer substantially consists of a silicate. The surface modification layer preferably contains 50 to 100 wt % of silicate. Although the surface modification layer preferably contains 100 wt % of silicate, it may contain 50 to 80 wt % of silicate.

As shown in the production method described below, by a heat treatment of the SiC ceramics as a matrix, a surface modification layer containing a silicate is produced on the surface or in the vicinity of the surface of the SiC ceramics. The quantity of the surface modification layer containing a silicate thus formed relative to the SiC ceramics is not particularly limited; the amount is optimized according to the environment in which the SiC ceramics member is used. The thickness of the surface modification layer containing a silicate relative to SiC is optimally designed according to the member to be used. The thickness of the surface modification layer containing a silicate may be set to, for example, about 100 μm. Further, the thickness of the surface modification layer containing a silicate may be about 1 to 50 μm, or about 2 to 20 μm.

In the SiC ceramics of the present invention, a surface modification layer containing a silicate ($Yb_2SiO_5$, $Yb_2Si_2O_7$, and the like) is formed by a reaction of silica ($SiO_2$) formed by the oxidation of the surface with the additives ($Yb_2O_3$, or the like) inside the material. The SiC ceramics of the present invention comprises a surface modification layer containing a silicate such as $Yb_2Si_2O_7$, $Al_2SiO_5$, and the like. Since the silicate has excellent heat resistance and environmental resistance, the SiC ceramics of the present invention has excellent environmental resistance derived from the surface modification layer, and is resistant to a steam of about 1600° C.

[2] Method for Producing SiC Ceramics

The silicon carbide (SiC) ceramics of the present invention may be produced by a method characterized by comprising:

(1) a step of dispersing a silicon carbide-forming raw material (SiC-forming raw material) and a metal oxide in a dispersion medium;

(2) a step of sintering the dispersion product obtained in step (1); and (3) a step of heat-treating the sintered product obtained in step (2) to form a surface modification layer containing a silicate on the SiC ceramics, which is a matrix.

FIG. 1 shows one embodiment of the SiC ceramics according to the present invention.

(1) Dispersion Step (Sample Production Step) (1)

In step (1), a raw material for forming the SiC, which is a matrix, and a metal oxide are dispersed in a dispersion medium.

In liquid phase sintering, SiC powder and, as necessary, a sintering adjuvant, may be added to the SiC-forming raw material. By adding a sintering adjuvant, it is possible to impart sufficient fracture strength, even when the sintering temperature is low. The amount of the sintering adjuvant to be added is, for example, about 0.1 to 25 parts by weight based on 100 parts by weight of the total raw material powder; i.e., the total of SiC (in a powder form or the like) and a metal oxide ($Yb_2O_3$ or the like in a powder form) in the dispersion product. By specifying the amount of the sintering adjuvant to be added within the above range, it is possible to desirably form a surface modification layer of a silicate on the SiC.

In the reaction sintering, it is preferable to use SiC powder, C powder, and Si powder. When SiC powder is used as SiC, the particle diameter of the SiC powder is not particularly limited. It is preferable to use fine SiC powder having an average particle diameter of about 0.02 to 20 μm. The type of the SiC is not particularly limited. For example, cubic crystal powder such as β-SiC powder, hexagonal crystal powder such as α-SiC powder, and the like, are preferably used as the SiC-forming raw material.

The metal oxide is preferably at least one metal oxide selected from the group consisting of scandium oxide ($Sc_2O_3$), yttrium oxide ($Y_2O_3$), erbium oxide ($Er_2O_3$), ytterbium oxide ($Yb_2O_3$), alumina ($Al_2O_3$), and lutetium oxide ($Lu_2O_3$).

The metal oxide is preferably a rare earth metal oxide; and is preferably, for example, at least one metal oxide selected from the group consisting of scandium oxide ($Sc_2O_3$), yttrium oxide ($Y_2O_3$), erbium oxide ($Er_2O_3$), ytterbium oxide ($Yb_2O_3$), and lutetium oxide ($Lu_2O_3$).

The metal oxide serves as a raw material of a silicate ($Yb_2SiO_5$, $Yb_2Si_2O_7$, or the like) forming the surface modification layer. It is preferable to use powder of a substance stable in the environment in use. The SiC (in a powder form or the like) and a metal oxide ($Yb_2O_3$ and the like in a powder form), as the raw material, are dispersed in a dispersion medium, thereby forming a dispersion product (slurry). It is preferable to use an organic solvent such as water, alcohol (ethanol, isopropanol, or the like), and the like, as the dispersion medium. The SiC-forming raw material and the oxide may be evenly dispersed in the dispersion medium. The concentration of the raw material (SiC and metal oxide) in the dispersion product (slurry) is not particularly limited. The raw material in the dispersion product may have any concentration that enables easy treatment. The concentration is, for example, as a solids content, preferably about 5 to 50 wt %, more preferably about 10 to 30 wt % in the dispersion product.

(2) Sintering Step (2)

In step (2), the dispersion product (slurry) obtained in step (1) is sintered (liquid phase sintering or the like) to obtain an SiC ceramics sintered product.

Before the sintering, the dispersion product (slurry) is molded into a desired shape, and then dried. An appropriate temperature and duration may be set for the drying. The drying may be carried out under any atmosphere; for example, it may be natural drying in an ambient atmosphere, or vacuum-drying.

The sintering temperature is typically about 1400° C. or more. The sintering temperature is preferably about 1700° C. or more for the liquid phase sintering method, so as to impart sufficient fracture strength. When a sintering adjuvant is added, the sintering temperature may be slightly lower. For example, sufficient fracture strength can be imparted at a sintering temperature of, for example, about 1600° C. The upper limit of the sintering temperature may be set according to the heat-resistant temperature of SiC (matrix).

In the reaction sintering, pressure may be applied for the molding; however, pressure application is not particularly necessary for the sintering. The pressure during the sintering according to the liquid phase sintering method is not particularly limited. As the pressure during the sintering increases, sufficient strength can be imparted in a shorter amount of time. The pressure is generally about 5 MPa or more, particularly preferably about 10 to 30 MPa.

Although the sintering is usually performed for about an hour, the duration may be optimally set according to the shape and the size of the member. An inert gas atmosphere using nitrogen, argon, helium, or the like; or a reducing atmosphere, is preferable during sintering.

(3) Heat Treatment Step (Step of Forming Surface Modification Layer) (3)

In step (3), the sintered product obtained in step (2) is heat-treated to form a surface modification layer containing a silicate on the SiC ceramics as the matrix.

A silicate corresponding to the metal oxide, which is added as the raw material, is produced. For example, depending on the metal oxide to be added, scandium silicate ($Sc_2Si_2O_7$), yttrium silicate ($Y_2SiO_5$), erbium silicate ($ErSiO_5$), ytterbium silicate ($Yb_2SiO_5$), ytterbium silicate ($Yb_2Si_2O_7$), aluminum silicate ($Al_2SiO_5$), or lutetium silicate ($LuSiO_5$) is produced, thereby forming a surface modification layer.

The heat treatment is preferably carried out under an oxidation atmosphere, for example, under an ambient atmosphere or steam atmosphere. The temperature during the heat treatment is preferably about 800 to 1700° C., more preferably about 1100 to 1500° C. The pressure in the heat treatment is not particularly limited. The duration of the heat treatment is preferably about 100 hours, more preferably about 0.5 to 72 hours.

By performing a heat treatment at a temperature of about 1100° C. or more, the surface of SiC (substrate) as the base is oxidized as shown in chemical formula (1) below, thereby producing silica ($SiO_2$). The silica ($SiO_2$) undergoes, for example, the reaction represented by chemical formula (2)

with the raw material oxide ($Yb_2O_3$ or the like), thereby forming a film having a silicate (silicate such as $Yb_2Si_2O_7$, $Yb_2SiO_5$, or the like) composition.

In view of the self-repairing property of the SiC ceramics of the present invention, it is sufficient that a silicate is formed on the surface modification layer thereof. The surface modification layer preferably comprises 50 wt % or more of a silicate so as to ensure excellent heat resistance and environmental resistance of the silicon carbide ceramics to be obtained. The upper limit of the amount of the silicate contained in the surface modification layer is nearly 100 wt %. In this case, the surface modification layer is constituted substantially of a silicate. The surface modification layer preferably contains 50 to 100 wt % of silicate. Although the surface modification layer preferably contains 100 wt % of silicate, it may contain 50 to 80 wt % of silicate.

A surface modification layer containing a silicate is preferably formed on the surface or in the vicinity of the surface of the SiC ceramics (substrate) as the matrix by subjecting the sintered product to a heat treatment. The surface modification layer is an elaborate silicic acid layer, and exerts a self-repairing property.

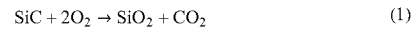

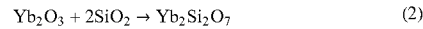

When the surface modification layer of the SiC ceramics of the present invention breaks, the silica ($SiO_2$) formed by the oxidation of SiC in the base reacts with the metal oxide ($Yb_2O_3$, or the like) in the SiC; as a result, another surface modification layer of silicate ($Yb_2SiO_5$, $Yb_2Si_2O_7$, and the like) is formed. The SiC ceramics of the present invention thus has a function to self-repair the film damage.

In the SiC ceramics of the present invention, the surface modification layer is formed on the surface or in the vicinity of the surface of the SiC ceramics (substrate) as the matrix, and is derived from the raw material forming the SiC ceramics. In other words, all of the raw materials of the silicate forming the surface modification layer are contained in the SiC ceramics as the matrix. This enables the SiC ceramics of the present invention to exert a self-repairing property.

The series of the steps described above is a production step for monolithic SiC ceramics.

[3] Ceramic Fiber Reinforced Composite Material Comprising the SiC Ceramics Described Above as a Matrix The ceramic fiber reinforced silicon carbide composite material comprises the SiC ceramics of the present invention as its matrix, as well as ceramic fibers. The SiC ceramics comprises a metal oxide, and a surface modification layer containing a silicate. The surface modification layer is derived from the raw material forming the SiC ceramics as a matrix.

When a ceramic fiber reinforced composite material is produced using the SiC ceramics of the present invention, a green sheet is first prepared by molding a slurry into a sheet, and a ceramic fiber woven fabric is laminated to form a laminate. Further, when a ceramic fiber reinforced composite material is produced, the fibrous woven fabric is impregnated with the slurry, or a prepreg sheet in which the slurry is applied is prepared. They are then laminated to obtain a laminate. By finally sintering the laminate(s), it is possible to produce a ceramic fiber reinforced silicon carbide composite material.

Ceramic Fiber

Ceramic fiber includes SiC fiber, carbon fiber (C fiber), alumina fiber, and the like.

Highly crystalline SiC fibers commercially available under the trade names of, for example, Tyranno SA (Ube Industries, Ltd.), Hi-Nicalon-S(Nippon Carbon Co., Ltd.), and the like, as well as fibers with lower crystallinity are preferably used as SiC fibers. In particular, since highly crystalline silicon carbide fibers have a high heat-resistant temperature, using them as the SiC fibers is advantageous.

Carbon fibers are advantageous in terms of low cost and little decrease in strength, even at a high temperature. Alumina fibers commercially available under the trade names of, for example, Nextel 312, Nextel 440 (Sumitomo 3M Ltd.), and the like, are preferably used as alumina fibers.

The shape of the ceramic fiber may be appropriately selected according to the use or required mechanical strength; for example, long fibers, i.e., continuous ceramic fibers, and short fibers obtained by cutting the long fibers, and the like may be used. In view of improving the fracture toughness of the composite material, it is preferable to use a long fiber. Insofar as the long fibers are continuous fibers, the fiber length thereof is not particularly limited.

It is preferable to use fibers having a length similar to that of the composite material, which is the final target object. If sufficient strength can be imparted to the composite material, long fibers shorter than the target composite material may be used. Short fibers are obtained by cutting long fibers; and have a length of, for example, about 1 to 10 mm.

The diameter of the ceramic fiber is not particularly limited. It is preferable to use ceramic fibers having a diameter of about 5 to 200 µm. Common ceramic fibers are provided as a fiber bundle of about 500 to 2000 fibers, or as a fiber structure using the bundle, such as knitted fabric or woven fabric. In the present invention, according to the shape or the like of the target complex, the bundled ceramic fibers, fiber structures made of ceramic fibers, and the like may be used. In view of the efficiency in the production of a ceramic fiber reinforced composite material, it is preferable to use ceramic fibers in the form of a fiber structure such as woven fabric.

SiC/SiC Composite Material

When a slurry in which powdery SiC ceramics of the present invention is dispersed in a dispersion medium is used as a raw material and a fiber structure such as knitted fabric or woven fabric is used as a raw material of SiC fibers, the composite material is structured as a laminate in which the SiC ceramics layer and the fiber structure are laminated, with a part of the SiC ceramics permeating between the SiC fibers.

Further, when the bundled SiC fibers are used as SiC fibers, the bundled SiC fibers are embedded in the SiC ceramics. Depending on the disposing pattern of the SiC fibers, the composite material may have a non-reinforced portion in which the SiC fibers are not disposed, in addition to the reinforced portion in which the SiC fibers are disposed in the SiC ceramics of the present invention.

The amount of the SiC fibers is not particularly limited, insofar as sufficient fracture strength can be imparted to the complex. The volume ratio of the SiC fibers is preferably about 10 to 90%, and more preferably about 30 to 70%, based on the entire material of the composite.

In the SiC/SiC composite material, the bond strength between the SiC ceramics and the SiC fibers moderately decreases. In the SiC/SiC composite material, even if cracks are generated in the SiC ceramics, the cracks can be prevented from directly propagating to the SiC fibers; instead, the cracks can be deflected along the fiber direction. Further, due to the slippage in the interface with the SiC fibers, pull-out of the SiC fibers, and the like, a behavior called pseudoductility, which is similar to ductility, is exhibited, thereby ensuring a high fracture toughness.

[4] Method for Producing SiC/SiC Composite Material

The method for producing the SiC/SiC composite material is not particularly limited. The SiC/SiC composite material may be produced by a liquid phase sintering method, reaction sintering method, and the like, as detailed below.

(1) Liquid Phase Sintering Method

In the liquid phase sintering method, a powdery raw material is dispersed in a dispersion medium to obtain a slurry, and the slurry is mixed with SiC fibers disposed in a predetermined pattern to obtain a mixture used for sintering; after which the mixture is sintered, thereby obtaining an SiC/SiC composite material.

Among the raw materials used for the liquid phase sintering method, powder may be used as the SiC ceramics of the present invention. As explained above, the SiC ceramics of the present invention comprises a metal oxide. The particle diameter of the SiC ceramic powder is not particularly limited. It is sufficient that the SiC ceramic powder is fine particles capable of forming a uniform slurry. For example, fine powder having an average particle diameter of about 0.02 to 20 µm may be used.

An organic solvent such as water, alcohol (ethanol, isopropanol, or the like), and the like, is preferably used as the dispersion medium to prepare the slurry containing the powdery raw material. The slurry may be obtained by evenly dispersing the SiC ceramic powder in the dispersion medium. The concentration of the powdery raw materials in the slurry is not particularly limited, and any concentration enabling easy handling may be selected. The concentration is, for example, as a solids content, preferably about 5 to 50 wt %, more preferably about 10 to 30 wt %.

The slurry thus prepared above and the SiC fibers are mixed to produce a mixture used for sintering. As the specific method for producing a mixture of a powdery raw material and the SiC fibers used for sintering, a method in which SiC fibers are used as a fiber structure such as knitted fabric or woven fabric, and the slurry is applied to the fiber structure of the SiC fibers to infiltrate into the structure, is preferably used.

Further, when the bundled SiC fibers are used, preferably, a slurry in which the powdery raw material is dispersed is placed in a mold, and the bundled SiC fibers are disposed therein in an arbitrary form. In this case, the disposition of the bundled SiC fibers is not limited to disposition in a single direction. The bundled SiC fibers may be disposed in two intersecting directions, and preferably disposed in other arbitrary directions.

The slurry containing powdery raw material is preferably dried and molded into a sheet, and then formed into a laminate together with a fiber structure of the SiC fibers, thereby obtaining a mixture used for the sintering. When the bundled SiC fibers are used, the bundled SiC fibers are preferably disposed corresponding to the pattern of the SiC fibers in the final composite material, and then the layer of the disposed bundled SiC fibers and the sheet-shaped slurry layer are laminated to obtain a mixture used for sintering.

It is preferable to laminate two or more layers of each of the sheet-shaped slurry layer and the SiC fiber layer according to the thickness of the target composite material. In this case, the direction in which the SiC fibers are oriented preferably varies for each layer. This makes it possible to further increase the strength.

Powders of yttrium oxide ($Y_2O_3$), ytterbium oxide ($Yb_2O_3$), alumina ($Al_2O_3$), or the like are preferably added as a sintering adjuvant as necessary to the mixture before sintering. For example, the sintering adjuvant may be added to a slurry containing the powdery raw material. As described above, yttrium oxide ($Y_2O_3$), ytterbium oxide ($Yb_2O_3$), and alumina ($Al_2O_3$) are metal oxides used as the raw materials of the surface modification layer, and also serve as sintering adjuvants. The amount of the sintering adjuvant to be added is preferably, for example, about 0.1 to 25 parts by weight based on 100 parts by weight of the total of the raw material powder of SiC ceramics contained in a slurry. By adding a sintering adjuvant, it is possible to impart sufficient fracture strength, even when the sintering temperature is low.

After the mixture of the SiC ceramics and the SiC fibers is prepared in the manner described above, the mixture is sintered under elevated pressure, thereby obtaining the target SiC/SiC composite material.

Generally, the sintering temperature is preferably about 1400° C. or more. The sintering temperature is more preferably about 1700° C. or more, in view of imparting sufficient fracture strength to the SiC/SiC composite material. By adding a sintering adjuvant, sufficient fracture strength can be imparted even when the sintering temperature is, for example, about 1600° C. The upper limit of the sintering temperature may be set corresponding to the heat-resistant temperature of SiC fibers to be reinforced. When highly crystalline silicon carbide fibers are used, the upper limit of the sintering temperature is preferably up to about 2000° C.

The pressure upon the sintering is not particularly limited. As the pressure increases, sufficient strength can be imparted in a shorter amount of time. The pressure is generally about 5 MPa or more, particularly preferably about 10 to 30 MPa. An inert gas atmosphere using nitrogen, argon, helium, or the like is preferable for the sintering. It is preferable to perform sintering in an inert gas atmosphere or reducing atmosphere so as to prevent oxidation of the carbon material upon the sintering.

By further performing a heat treatment, it is possible to form a surface modification layer.

(3) Reaction Sintering Method

In the reaction sintering method, a matrix-forming raw material, which contains powder containing a carbon component, a resin, Si powder, and, as necessary, SiC powder, is used as a slurry; the slurry is mixed with SiC fibers disposed in a predetermined pattern to obtain a mixture used for sintering; and the mixture is heated to a temperature equal to or greater than the melting point of silicon, thereby reacting carbon and Si to form an SiC-phase matrix. The slurry contains a metal oxide that is contained in the SiC ceramics of the present invention. With this method, the SiC fibers are embedded in the matrix, thereby obtaining the target SiC/SiC composite material.

Although carbon powder is generally used as the powder containing a carbon component among the raw materials for producing a slurry, resins that are carbonized at a temperature equal to or lower than the melting point of silicon, such as a phenol resin, may also be used. When a resin is used as the powder containing a carbon component, in the step of heating to a temperature equal to or greater than the melting point of silicon, the resin is carbonized before the temperature reaches 1414° C., i.e., the melting point of silicon; and the component resulting from the carbonization of the resin and the melted silicon are reacted to form SiC when the temperature reaches the melting point of silicon.

SiC powder may further be added to the slurry containing the matrix phase-forming raw materials. By adding SiC powder to the slurry, SiC powder serves as a nuclei, and SiC generated by the reaction grows around the nuclei, thereby forming a matrix. This improves the efficiency in forming a matrix phase. The amount of the SiC powder to be added to the slurry is, for example, about 0.1 to 50 parts by weight based on the total amount, i.e., 100 parts by weight, of the powder containing a carbon component, Si powder, and the raw material powder for forming the second phase in the slurry.

The particle diameters of the powder containing a carbon component; the Si powder; the SiC powder and the metal oxide; the method for forming the slurry; and the like, may be similar to those in the liquid phase sintering method. The mixing ratio of the components is not limited. However, it is also possible to form a matrix phase having an elaborate structure by adding an excess amount of Si relative to the carbon component. The method for producing the mixture of the matrix phase-forming raw materials and the SiC fibers to be used for reaction sintering may also be similar to that in the liquid phase sintering method.

After producing the mixture of the matrix phase-forming raw materials and the SiC fiber by the method described above, SiC is formed by heating the mixture to a temperature equal to or greater than the melting point of silicon so as to react carbon with Si, thereby forming a multiphase matrix containing an SiC phase and the second phase.

The heating temperature may be about 1414° C. or more, which is the melting point of silicon; however, to impart sufficient fracture strength, the heating temperature is preferably about 1450° C. or more. The upper limit of the heating temperature may be set to the heat-resistant temperature of SiC fibers to be reinforced. When highly crystalline silicon carbide fibers are used, the upper limit of the heating temperature is preferably about 2000° C. A vacuum atmosphere is preferably used during the heating. An inert gas atmosphere using nitrogen, argon, helium, or the like is preferable.

By further performing a heat treatment, it is possible to form a surface modification layer.

Excellent Environmentally Resistant Coating Performance by the Surface Modification Technique of the Present Invention The present invention is a technique for forming a surface modification layer of a silicate ($Yb_2SiO_5$, $Yb_2Si_2O_7$, or the like) having excellent steam-resistant characteristics on an SiC surface by using a method completely different from previously known PVD (physical vapor deposition) or the like. More specifically, the SiC ceramics of the present invention is such that the surface of the SiC (matrix) is modified with a silicate ($Yb_2SiO_5$, $Yb_2Si_2O_7$, or the like).

The SiC ceramics of the present invention also encompasses those having an excellent high-temperature-steam-resistant coating, which do not require a steam-resistant layer of BSAS ($1-xBaO-xSrO-Al_2O_3-2SiO_2$, $0 \leq x \leq 1$). In the SiC ceramics of the present invention, if the thermal expansion coefficient of the SiC is close to that of the silicate, the difference in thermal expansion coefficient between SiC and the silicate is reduced without providing a thermal expansion coefficient difference-reducing layer such as BSAS+Mullite ($3Al_2O_3 \cdot 2SiO_2$). Further, the SiC ceramics of the present invention is superior in the following point. When, for example, $Yb_2Si_2O_7$ is contained as the major component of the silicate, the thermal expansion coefficient of the SiC becomes close to that of the silicate, and the difference in thermal expansion coefficient between the matrix and the surface modification layer becomes small; as a result, it is not necessary to provide a thermal expansion coefficient difference-reducing layer.

In the previously known coating technology, the SiC substrate cannot be sufficiently bonded with an environmentally resistant coating such as a steam-resistant coating. For this reason, previously, a bonding layer, which also serves as an oxidation-resistant coating, of Si or the like was formed; and a thermal expansion-reducing layer for the bonding layer and the environmentally resistant coating was formed thereon, thereby forming an environmentally resistant coating layer. In the present invention, since the surface of the matrix is directly converted into a surface modification layer, a bonding layer is not necessary.

The SiC ceramics of the present invention does not require a complicated and expensive multilayer coating, and the surface of the SiC matrix thereof can be modified merely through a heat treatment by using a silicate. The SiC ceramics of the present invention can thus be prepared easily and at low cost. In the SiC ceramics of the present invention, since the silicate surface modification layer (coating layer) is formed by directly oxidizing the SiC surface, it is not necessary to externally add a surface modification layer from outside. In the SiC ceramics of the present invention, it is possible to control the prevention of the formation of a $SiO_2$ layer between the SiC and the silicate (surface modification layer) on the surface thereof. If the $SiO_2$ layer is not formed, the risk of developing cracks attributable to the $SiO_2$ layer is prevented. In the SiC ceramics of the present invention, even when the surface modification layer thereof is peeled off, or even when cracks are generated on the surface modification layer thereof, a new silicate surface modification layer can be formed by oxidation. The SiC ceramics of the present invention thus ensures a self-repairing property.

Since the surface modification technique of the present invention uses a reaction between a metal oxide ($Yb_2O_3$ or the like) and $SiO_2$ (a reaction product of SiC and oxygen), it enables formation of an elaborate surface modification layer. When the SiC ceramics of the present invention comprises a surface modification layer containing a silicate such as $Yb_2Si_2O_7$, $Al_2SiO_5$, or the like, steam resistance at about 1600° C. can be expected. The surface modification technique of the present invention requires only a heat treatment. Further, when a BN particle dispersion SiC composite material ($Yb_2Si_2O_7$) is used together, it is possible to easily prepare a steam-resistant SiC composite material at low cost. By combining a BN particle dispersion composite material having excellent oxidation resistance with an oxide ($Yb_2O_3$ or the like), a surface modification layer of a silicate ($Yb_2Si_2O_7$) can be formed on the surface of the BN particle dispersion composite material as a high-temperature-steam-resistant material.

In the previously known SiC composite material, an Si layer as oxidation resistant coating and a thermal expansion coefficient reducing layer were necessary. Further, the previous SiC composite material had a problem of peeling of the coating due to oxidation of the Si layer when cracks were generated.

In the SiC ceramics of the present invention, since the thermal expansion coefficient of the silicate ($Yb_2Si_2O_7$, or the like) contained in the surface modification layer is close to that of the SiC, the interfacial peeling of the surface modification layer due to the thermal expansion difference does not easily occur even if the intermediate layer of the thermal expansion coefficient reducing layer, which has previously been required, is omitted. In addition, the present invention enables formation of a surface modification layer directly by a chemical reaction on the surface without requiring an Si layer or the like as a bonding layer for bonding an SiC matrix and a coating layer also serving as an oxidation-resistant coating.

The SiC ceramics of the present invention may also be applied to a composite material comprising SiC as a matrix (C fiber-reinforced SiC composite material (C/SiC), SiC fiber-reinforced SiC composite material (SiC/SiC) or the like). For example, by adding an oxide ($Yb_2O_3$ or the like) to the matrix of SiC/SiC to form a silicate ($Yb_2Si_2O_7$) on the surface, it is possible to produce an excellent composite material. In this case, it is sufficient that the oxide ($Yb_2O_3$ or the like) is contained at least at or in the vicinity of the surface of the matrix. More specifically, it may be structured such that the oxide ($Yb_2O_3$ or the like) is not contained in the entire matrix, but in a part thereof.

When coating of a greater thickness than that of the coating layer formed only of the surface modification of the present invention is necessary, it is possible to combine the surface modification technique of the present invention with the previously known coating technique. With the surface modification technique of the present invention, there is no difference in thermal expansion coefficient if an environmentally resistant coating is formed from the same material as that of the surface modification material, and the coating may thus be directly applied. Therefore, it is possible to omit the bonding layer and the thermal expansion coefficient reducing layer. This technique corresponds to, for example, an embodiment in which $Yb_2Si_2O_7$ is formed on a silicon carbide ceramics as a matrix using the surface modification technique of the present invention, and $Yb_2Si_2O_7$ is applied thereon as coating using an existing technique. This technique is a preferred embodiment in terms of practical use.

EXAMPLES

The present invention is described in more detail below with reference to Examples.

Example 1

An SiC ceramics was formed through step (1) of dispersing SiC and a metal oxide in a dispersion medium; step (2) of sintering the dispersion product obtained in step (1); and step (3) of heat-treating the sintered product obtained in step (2) to form a surface modification layer containing a silicate on the SiC ceramics as a matrix.

Metal Oxide: Ytterbium Oxide ($Yb_2O_3$)
Sintering Condition: 1850° C., 20 MPa, 1 hour
Heat Treatment Condition: 1350° C., under an ambient atmosphere or steam atmosphere, 24 hours
Silicate: Ytterbium Silicate ($Yb_2Si_2O_7$)

Figure 2:
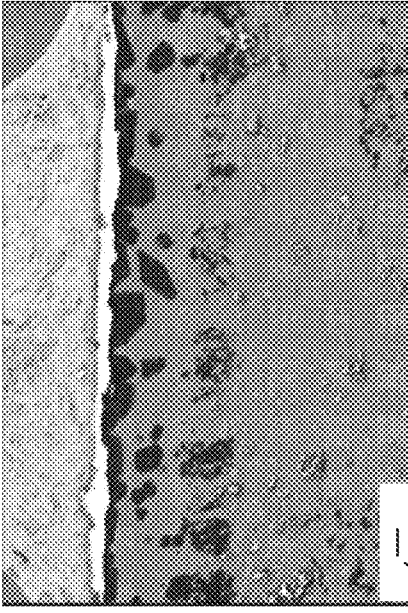
FIG. 2: A figure showing a comparison of heat-treated (1350° C.-24 h) liquid phase sintering SiC containing $Yb_2O_3$, according to the Examples.

FIG. 2 shows a comparison of liquid phase sintering SiC using $Yb_2O_3$ (sintering adjuvant) according to the Examples after a heat treatment (1350° C.-24 h). As examples of the sintering adjuvant and metal oxide, $Al_2O_3$ and $Yb_2O_3$ were contained. $Yb_2O_3$ is a metal oxide, which also functions as a sintering adjuvant in the liquid phase sintering, thus forming a surface modification layer as surface modification.

In FIG. 2, the amounts of the silicate contained in the surface modification layers in the Examples are shown. An SiC dispersion product (Yb—SiC6) containing 6 wt % of $Yb_2O_3$ was sintered by liquid phase sintering, and then subjected to a heat treatment under an ambient atmosphere. The content of the silicate ($Yb_2Si_2O_7$) in the surface modification layer was 50 vol % (volume %) according to image analysis. Further, when the heat treatment was performed under a steam atmosphere, the content of the silicate ($Yb_2Si_2O_7$) in the surface modification layer was 79 vol % according to image analysis.

An SiC dispersion product (Yb—SiC20) containing 20 wt % of $Yb_2O_3$ was sintered by liquid phase sintering, and then subjected to a heat treatment under an ambient atmosphere. The content of the silicate ($Yb_2Si_2O_7$) in the surface modification layer was 60 vol % according to image analysis. Further, when the heat treatment was performed under a steam atmosphere, the content of the silicate ($Yb_2Si_2O_7$) in the surface modification layer was 53 vol % according to image analysis.

The SiC ceramics of the present invention comprises a metal oxide, and a surface modification layer containing a silicate. The surface modification layer is derived from a raw material forming the SiC ceramics as the matrix. Therefore, in the SiC ceramics of the present invention, "vol % (volume %)" measured based on image analysis in the Examples may be converted to "wt % (weight %)."

Figure 3:
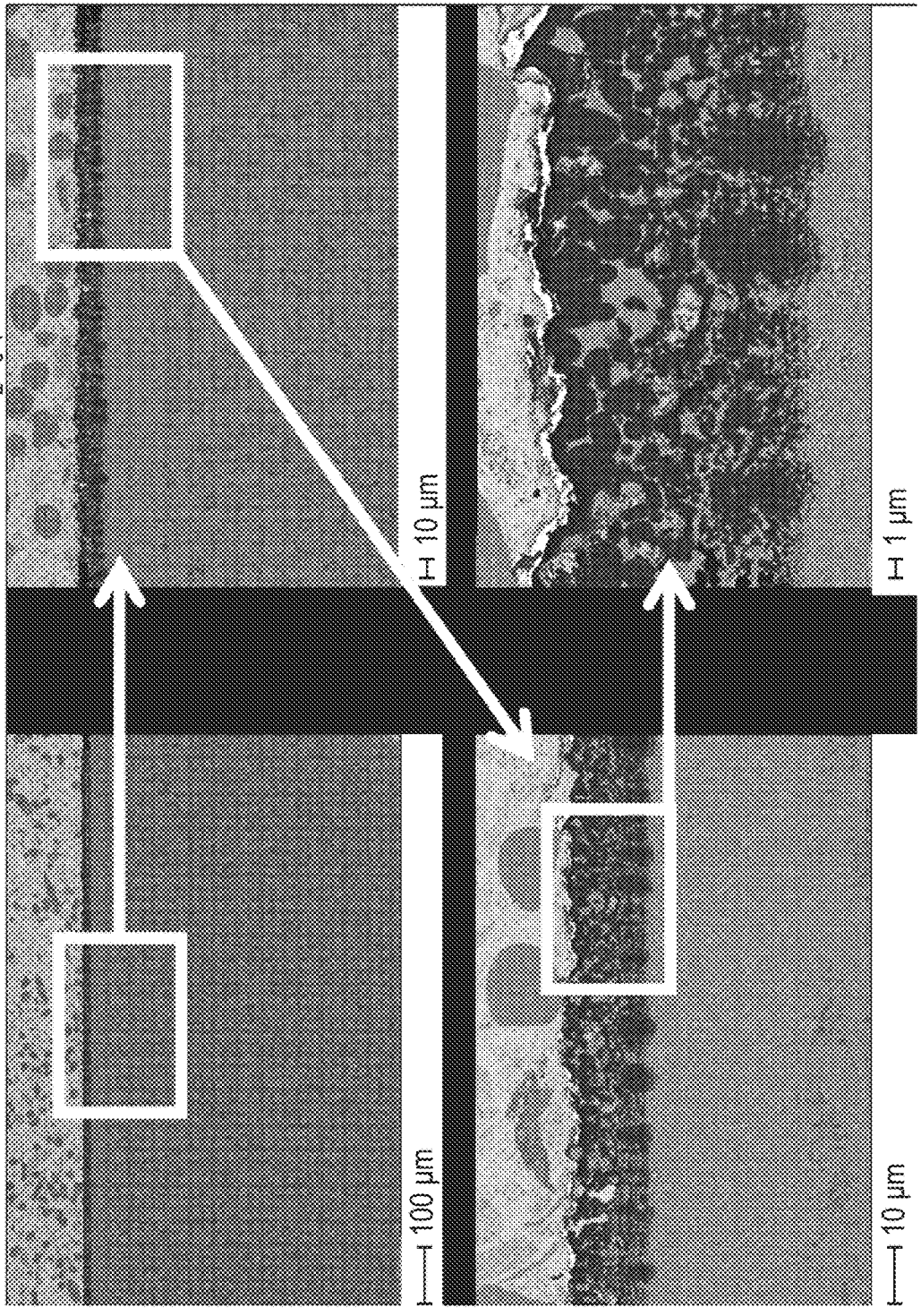
FIG. 3: A figure showing a tissue (20 w % material, 1350° C.-24 h) of the heat-treated liquid phase sintering SiC containing $Yb_2O_3$, according to the Examples.
Figure 4:
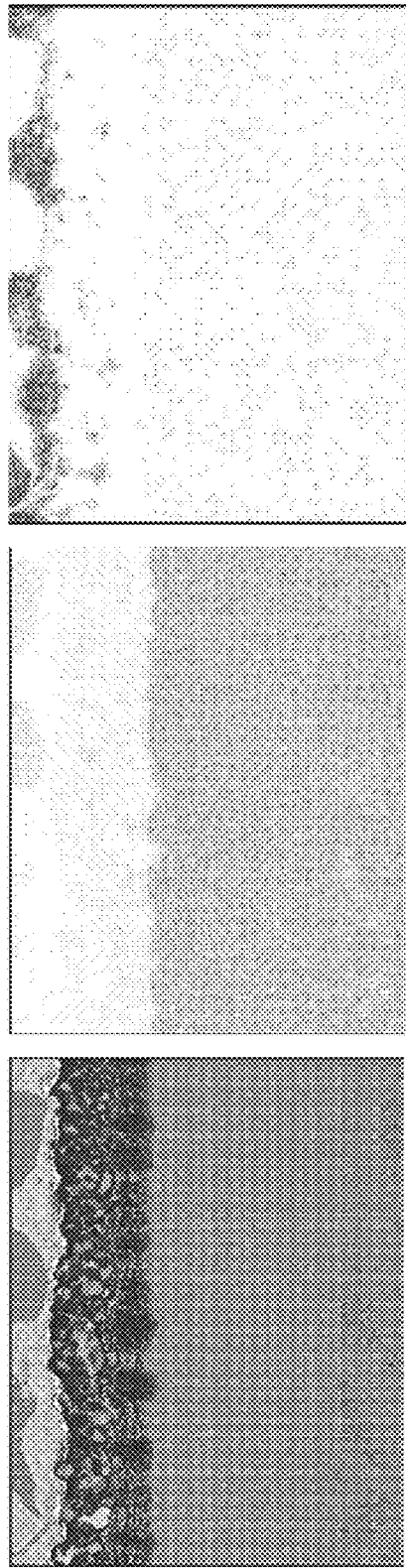
FIG. 4: A figure showing a composition analysis (20 w % material, 1350° C.-24 h) of the heat-treated liquid phase sintering SiC containing $Yb_2O_3$, according to the Examples.
Figure 4:
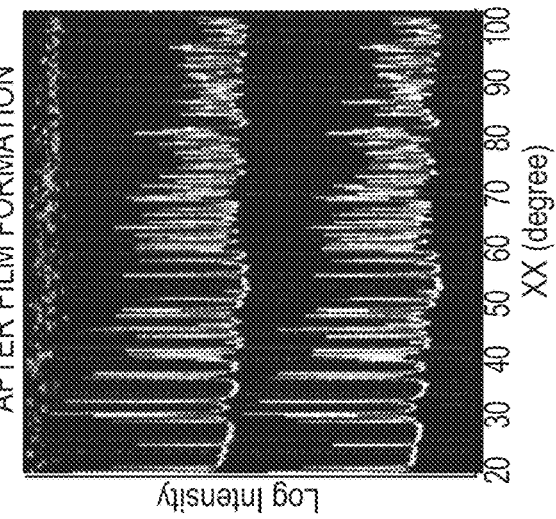
Figure 4:
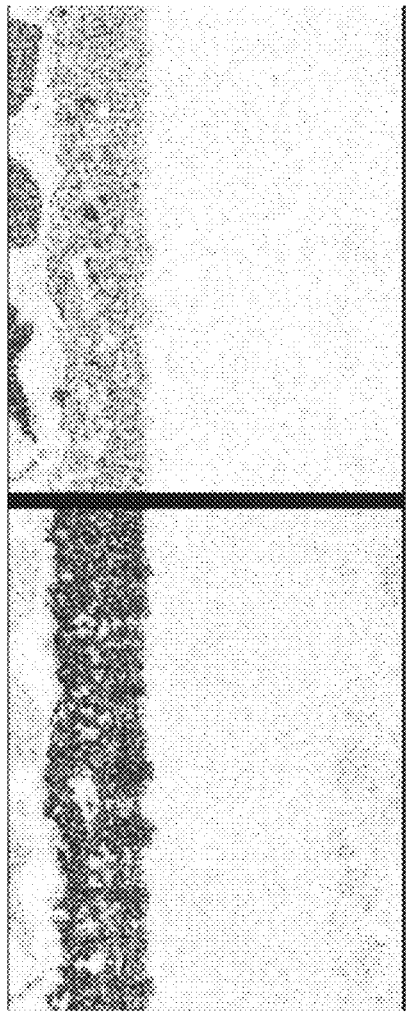

FIG. 3 shows a tissue (20 w % material, 1350° C.-24 h) of liquid phase sintering SiC using $Yb_2O_3$ (sintering adjuvant) according to the Examples after a heat treatment. FIG. 4 shows a composition analysis (20 w % material, 1350° C.-24 h) of liquid phase sintering SiC using $Yb_2O_3$ (sintering adjuvant) according to the Examples after a heat treatment.

Example 2

Figure 5:
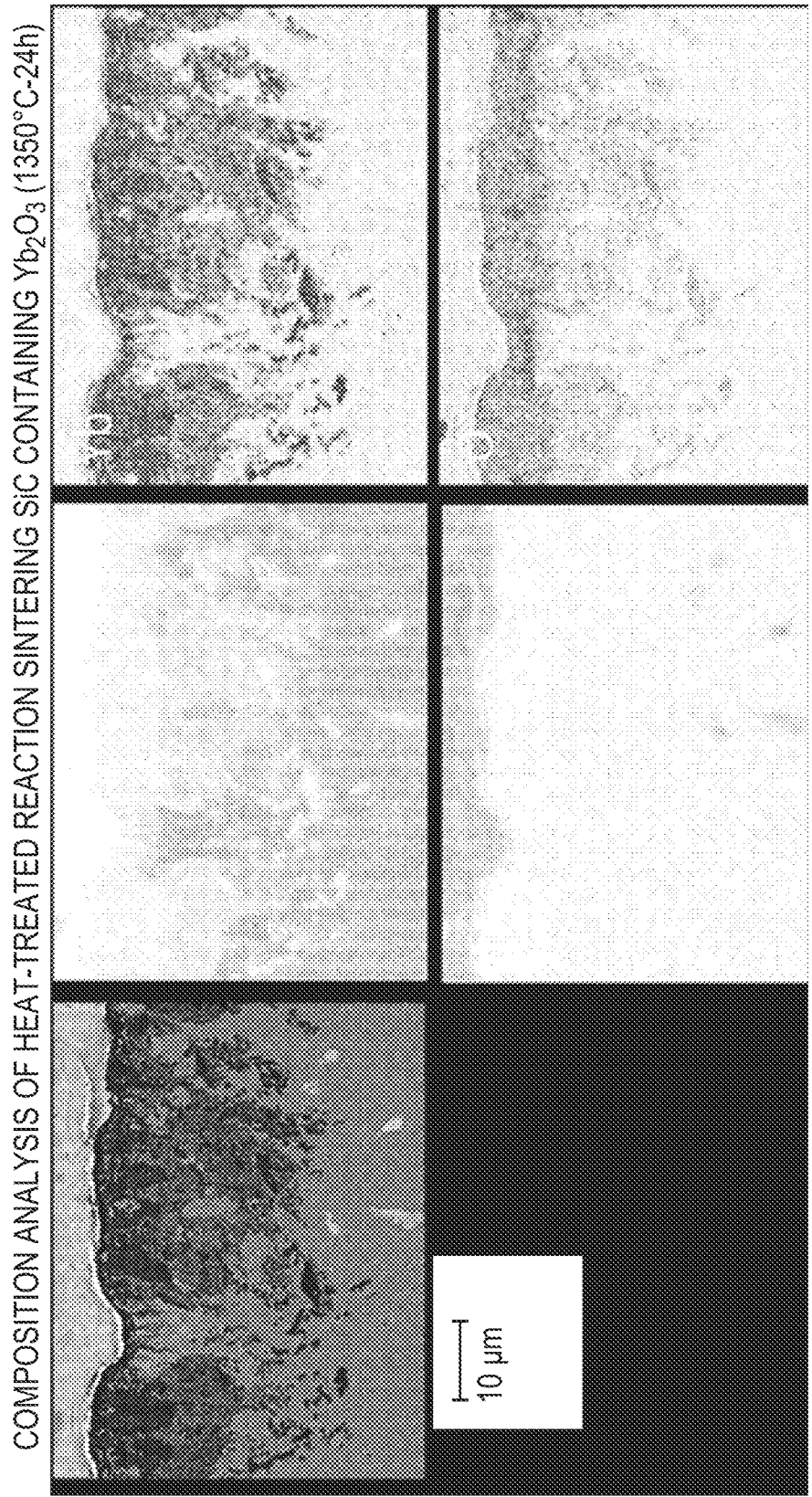
FIG. 5: A figure showing a composition analysis (1350° C.-24 h) of the heat-treated reaction sintering SiC containing $Yb_2O_3$, according to the Examples.

An SiC ceramics was formed through step (1) of dispersing SiC, C, Si, and a metal oxide in a dispersion medium; step (2) of sintering the dispersion product obtained in step (1); and step (3) of heat-treating the sintered product obtained in step (2) to form a surface modification layer containing a silicate on the SiC ceramics as a matrix.
  Metal Oxide: Ytterbium Oxide ($Yb_2O_3$)
  Sintering Condition: 1460° C., 2 hours
  Heat Treatment Condition: 1350° C., under an ambient atmosphere, 24 hours
  Silicate: Ytterbium Silicate ($Yb_2Si_2O_7$)
FIG. 5 shows a composition analysis of reaction sintering SiC using $Yb_2O_3$ metal oxide of an Example after a heat treatment.

Example 3

Figure 6:
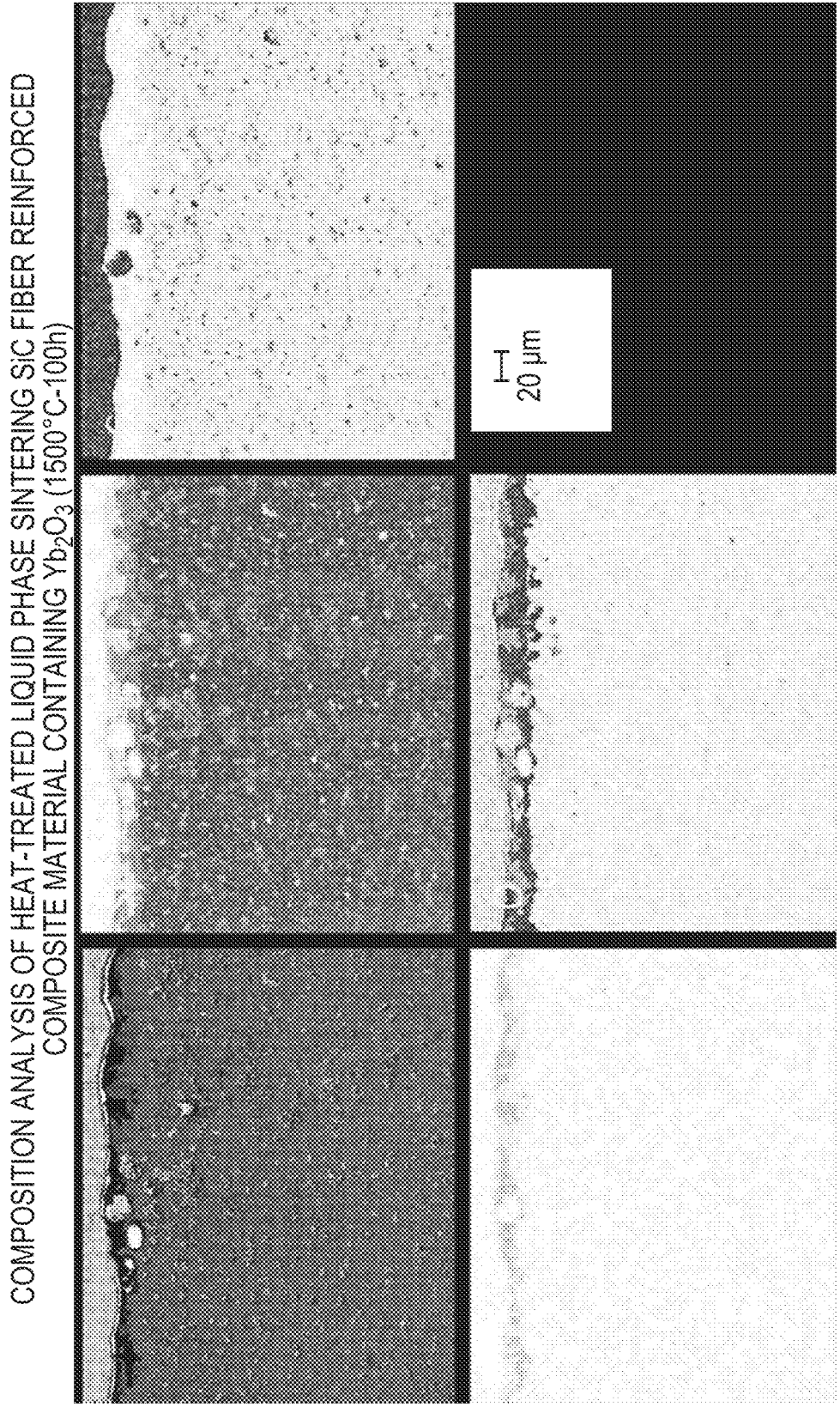
FIG. 6: A figure showing a composition analysis (1500° C.-100 h) of the heat-treated liquid phase sintering SiC fiber reinforced composite material containing $Yb_2O_3$, according to the Examples.

An SiC fiber reinforced composite material was produced through step (1) of dispersing SiC, BN, and a metal oxide in a dispersion medium; step (2) of forming a prepreg sheet by impregnating SiC fibers with the dispersion product obtained in step (1); step (3) of laminating the prepreg sheets obtained in step (2), and sintering the laminate; and step (4) of heat-treating the sintered product obtained in step (3) to form a surface modification layer containing a silicate on the SiC fiber reinforced composite material as a matrix.
  Metal Oxide: Ytterbium Oxide ($Yb_2O_3$)
  Sintering Condition: 1890° C., 20 MPa, 1 hour
  Heat Treatment Condition: 1500° C., under an ambient atmosphere, 100 hours
  Silicate: Ytterbium Silicate ($Yb_2Si_2O_7$)
FIG. 6 shows a composition analysis of a liquid phase sintering SiC fiber reinforced composite material using $Yb_2O_3$ metal oxide of an Example after a heat treatment. $Yb_2O_3$ is a metal oxide, and also functions as a sintering adjuvant in the liquid phase sintering, thereby forming a surface modification layer as surface modification.

Excellent Environmentally Resistant Coating Performance by the Surface Modification Technique of the Present Invention In the SiC ceramics of the present invention, by further subjecting the sintered product to a heat treatment (oxidation treatment), the surface is modified, thereby forming a silicate layer (surface modification layer). According to the present invention, it is not necessary to use a larger number of devices compared with prior art. Therefore, the energy and the cost can be reduced.

In the SiC ceramics of the present invention, the silicate constituting the surface modification layer is derived from SiC of the SiC ceramics. This technique is thus different from the film formation by the previously known coating technique. Further, according to the present invention, there is no risk of peeling of the surface modification layer containing a silicate at the interface between the surface modification layer and the SiC (matrix). In the SiC ceramics containing an metal oxide of the present invention, since the surface modification layer is derived from the SiC ceramics as the matrix, more specifically, since the surface modification layer is a silicate layer (surface modification layer) derived from SiC ceramics as a matrix, the SiC ceramics can be self-repaired even if the silicate surface modification layer is peeled off.

The invention claimed is:

1. A method for producing silicon carbide ceramics, comprising:
   (1) a step of dispersing a raw material for forming silicon carbide, and a metal oxide in a dispersion medium;
   (2) a step of sintering the dispersion product obtained in step (1) under an inert gas atmosphere or a reducing atmosphere at a temperature of 1400 to 1890° C.; and
   (3) a step of heat-treating the sintered product obtained in step (2) under an oxidation atmosphere at a temperature of 800 to 1700° C. to form a silicon carbide ceramics product comprising a surface modification layer containing a silicate on silicon carbide ceramics as a matrix,
   wherein the metal oxide described in step (1) consists of one metal oxide selected from the group consisting of scandium oxide ($Sc_2O_3$), yttrium oxide ($Y_2O_3$), erbium oxide ($Er_2O_3$), ytterbium oxide ($Yb_2O_3$), and lutetium oxide ($Lu_2O_3$);
   wherein the silicate consists of one silicate selected from the group consisting of scandium silicate ($Sc_2Si_2O_7$), yttrium silicate ($Y_2SiO_5$), erbium silicate ($ErSiO_5$), ytterbium silicate ($Yb_2SiO_5$), ytterbium silicate ($Yb_2Si_2O_7$), and lutetium silicate ($LuSiO_5$); and
   wherein the surface modification layer comprises 50 wt % or more of the silicate, and
   wherein the silicon carbide ceramics product comprises a metal oxide selected from the group consisting of scandium oxide ($Sc_2O_3$), yttrium oxide ($Y_2O_3$), erbium oxide ($E_2O_3$), ytterbium oxide ($Yb_2O_3$), and lutetium oxide ($Lu_2O_3$).

2. The method according to claim 1, wherein step (3) is a step of heat-treating the sintered product obtained in step (2) to form a surface modification layer containing a silicate around the surface of the silicon carbide ceramics as a matrix.

* * * * *